June 20, 1939.  I. C. MOLLESON  2,163,129
REMOVER FOR "PYREX" DISHES
Filed Oct. 11, 1938
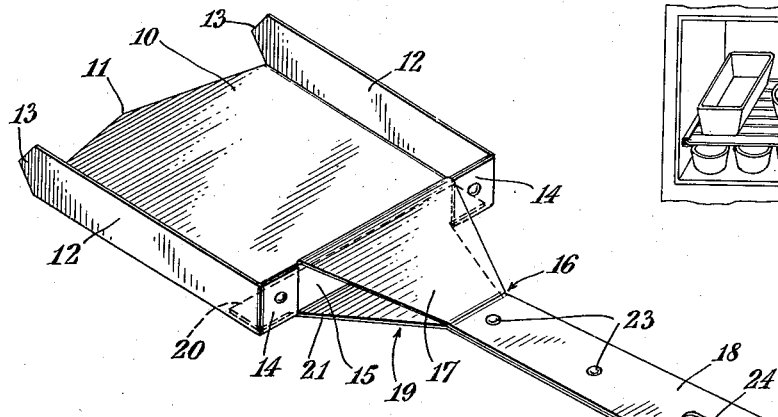
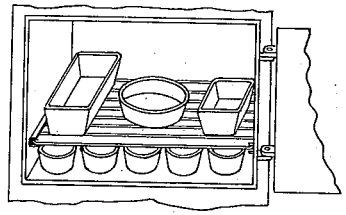
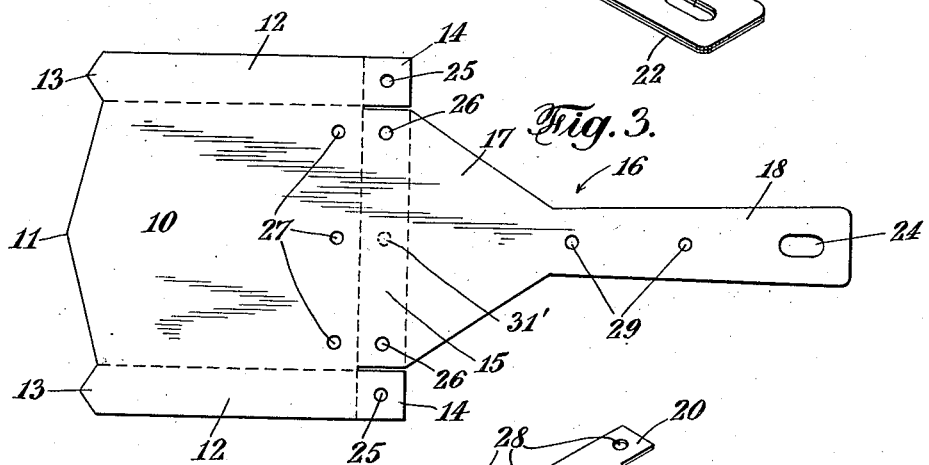
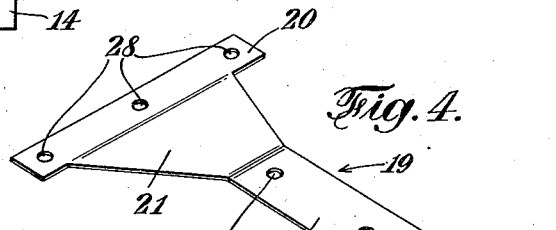
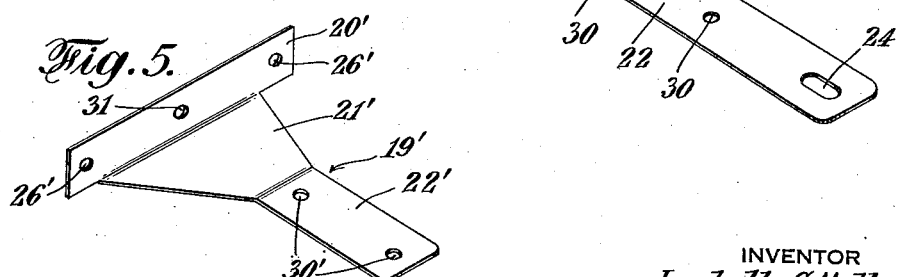
INVENTOR
Isabelle C. Molleson
BY
Pauline Klein
her ATTORNEY

Patented June 20, 1939

2,163,129

UNITED STATES PATENT OFFICE

2,163,129

REMOVER FOR "PYREX" DISHES

Isabelle C. Molleson, Baldwin, N. Y.

Application October 11, 1938, Serial No. 234,344

4 Claims. (Cl. 294—32)

This invention relates to dish handling devices in general, and particularly to what I term a remover for "Pyrex" dishes.

It is well known, that "Pyrex" or similar heat-proof dishes usually are not equipped with handles or other provisions by means of which the device may be inserted into or removed from hot ovens, or from open burners or the like. The handling of such dishes is consequently difficult and even dangerous, since it often occurs that they slip from the hand and may injure the skin by burning it. Particularly difficult is the handling of such hot dishes within a limited space, as, for instance, in an oven.

In order to simplify and make safer the handling of dishes of this type, within the confinement of an oven or the like, I have devised an instrumentality adapted to not only safeguard the cook against injury by burning, but to facilitate their handling generally.

The prime object of my invention, therefore, is to provide a practical, simple, inexpensive article for handling dishes of the "Pyrex" type, either cold or hot, so as to facilitate their placing into or their removal from hot ovens or the like.

The foregoing object and still other objects and advantages of my invention will become more fully apparent from the ensuing description and the accompanying drawing, the latter forming an essential part of my disclosure, but which drawing is not intended to limit my invention to the pictorial showing only, since it is intended to serve primarily for explanatory and descriptive purposes.

In the drawing:

Fig. 1 is a perspective view of a presently preferred form of my invention.

Fig. 2 illustrates a portion of an oven wherein are placed "Pyrex" dishes.

Fig. 3 represents a plan development of the major portion of my device.

Fig. 4 is a perspective view of one form of my handle reinforcing member employed in my device, and Fig. 5 is a modified form of such handle reinforcing member.

Referring now more specifically to the illustrations, numeral 10 denotes a dish support or dish accommodating portion of my device, which terminates at its front in a pointed end 11, by means of which the placing of my device beneath a hot dish is greatly facilitated. While front end 11 is shown in the form of an angular configuration, its shape may be rounded or designed in any other suitable way, so that it may freely pass beneath a dish.

Extending from the sides of the dish accommodating portion 10 are side walls 12, the front ends of which terminate in pointed or otherwise projecting portions 13, which latter are also intended to more readily facilitate the placing of a hot dish onto the dish accompanying portion 10. Moreover, these projecting side wall ends are designed to function as separators of closely grouped dishes, such as shown in the bottom row in Fig. 2.

The rear ends of side walls 12 terminate in attaching lips 14, which latter are intended to be bent inwards at right angles to side walls 12, and to serve as attaching means, whereby rear wall 15 is joined with the side walls.

As will be observed from Fig. 3, rear wall 15 forms an extension of supporting portion 10, and is bent upwards, as seen in Fig 1. Extending from the upper end of the rear wall is a handle 16, consisting of a tapered connecting piece 17 and a handle portion 18. From Fig. 3 it will be also observed that the dish supporting platform 10, side walls 12, attaching lips 14, rear wall 15, connecting portion 17 and handle portion 18 are integral, since they are made of a single piece of material.

In order to reinforce the handle 16, I preferably provide separate stiffening members, such as indicated in Figs. 4 and 5. Reinforcing member 19, shown in Fig. 4, consists of a bar portion 20 and a tapered connecting piece 21 and a handle extension 22. As will be seen from Fig. 1, bar portion 20 is secured to the bottom of supporting platform 10, while handle portion 22 is riveted at 23 to handle portion 18 of handle 16. It will be also observed that handle portions 18 and 22 are provided with apertures 24 for facilitating the suspension of my device.

The modified form of a reinforcing member, shown in Fig. 5, consists of a bar portion 20', a tapered portion 21', and a handle portion 22'. The latter is somewhat shorter than the handle extension 22, shown in Fig. 4, while the bar portion 20' is seen to be positioned at right angles to tapered portion 21'.

For the purpose of securing together the different portion of my device to form an instrumentality such as shown in Fig. 1, I provide lips 14 and rear wall 15 with corresponding rivet holes 25 and 26, respectively. For the attachment of reinforcing member 19 I provide in the dish supporting portion 10 and in the bar portion 20 corresponding rivet holes 27 and 28, respectively.

Obviously rivet holes have to be provided in handle portion 18 at 29, and corresponding holes in reinforcing member 19 at 30, and in reinforcing member 19' at 30'. The bar portion 20' of modified reinforcing member 19' is provided with rivet holes 26' and a central rivet hole 31, which latter corresponds to a central rivet hole 31', indicated in broken lines in Fig. 3.

When it is desired to construct my device by using modified reinforcing member 19', bar portion 20' will be attached to rear wall 15 of my device. In this case the end rivets passing through holes 26' of bar portion 20' of the reinforcing member, will also pass through holes 25 of lips 14, and through holes 26 of rear wall 15. Central hole 31 of the modified reinforcing member, and the broken line central hole 31' in the rear wall 15 will serve for the reception of a central rivet.

In the drawing I have shown rivet holes and rivets for holding my device in shape, it is quite obvious, however, that other means may be employed in securing the two parts of my device together, such as welding, through-punching, lock-punching, etc.

While I have illustrated and described a specific form of my invention, it is to be understood that I shall not be limited to the actual showing, and I, therefore, reserve for myself the right to make such changes and improvements as may become necessary due to the employment of my device for various purposes, without departing from the broad scope of my idea, as expressed in the annexed claims.

I claim:

1. A dish remover, comprising a dish accommodating portion provided with a pointed front, side walls with pointed ends, a rear wall joined with the side walls, a handle member extending from the rear wall, and a reinforcing member for the handle member.

2. In a dish remover, a dish accommodating or supporting member having a pointed front end, side walls for said supporting member having pointed front ends and terminating at their rear ends in attaching lips, a rear wall joined with the side walls by means of said lips, a handle portion extending from the rear wall, said supporting member, its side and rear walls and the handle portion being formed from one piece of material, and a handle reinforcing member secured to the handle portion and said supporting member.

3. In a dish remover, an instrumentality having a pointed dish supporting member and being provided with integral side and rear walls, the front ends of the side walls being pointed, and a handle forming an integral extension of the rear wall.

4. In a dish remover, as set forth in claim 3, and a reinforcing member for the handle extending from said dish supporting member and being secured to the latter and to said handle.

ISABELLE C. MOLLESON.